US009106668B2

(12) United States Patent
Chalouhi et al.

(10) Patent No.: US 9,106,668 B2
(45) Date of Patent: Aug. 11, 2015

(54) DISTRIBUTED PEER LOCATION IN PEER-TO-PEER FILE TRANSFERS

(75) Inventors: Olivier Chalouhi, Redwood City, CA (US); Paul Anton Richardson Gardner, Palo Alto, CA (US)

(73) Assignee: Azureus Software, Inc., Truckee, CA (US)

( * ) Notice: Subject to any disclaimer, the term of this patent is extended or adjusted under 35 U.S.C. 154(b) by 1496 days.

(21) Appl. No.: 12/328,492

(22) Filed: Dec. 4, 2008

(65) Prior Publication Data

US 2009/0319502 A1  Dec. 24, 2009

Related U.S. Application Data

(60) Provisional application No. 61/075,295, filed on Jun. 24, 2008, provisional application No. 61/133,314, filed on Jun. 27, 2008.

(51) Int. Cl.
*G06F 15/16* (2006.01)
*H04L 29/08* (2006.01)

(52) U.S. Cl.
CPC .......... *H04L 67/104* (2013.01); *H04L 67/1002* (2013.01); *H04L 67/1046* (2013.01); *H04L 67/1065* (2013.01); *H04L 67/101* (2013.01)

(58) Field of Classification Search
CPC . H04L 67/104; H04L 67/1065; H04L 67/101; H04L 67/1046
USPC .......................................... 709/204, 223–224
See application file for complete search history.

(56) References Cited

U.S. PATENT DOCUMENTS

| 2006/0149806 | A1* | 7/2006 | Scott et al. ..................... 709/201 |
| 2008/0037527 | A1* | 2/2008 | Chan et al. ..................... 370/353 |
| 2008/0040420 | A1* | 2/2008 | Twiss et al. .................... 709/203 |
| 2008/0086464 | A1* | 4/2008 | Enga ................................. 707/4 |
| 2008/0177767 | A1* | 7/2008 | Lin et al. ........................ 709/251 |
| 2009/0276522 | A1* | 11/2009 | Seidel ........................... 709/224 |

FOREIGN PATENT DOCUMENTS

WO   WO-2009158261 A1   12/2009

OTHER PUBLICATIONS

"BitTorrent Location-aware Protocol 1.0 Specification", http://wiki.theory.org/BitTorrent_Location-aware_Protocol_1.0_Specification, last modified Oct. 22, 2008, accessed Dec. 5, 2008, 6 pgs.

"Network Coordinates in the Wild", http://www.eecs.harvard.edu/~syrah/nc/wild-web/, last updated Feb. 23, 2007, accessed Dec. 5, 2008, 49 pgs.

Bindal, Ruchir, et al., "Improving Traffic Locality in BitTorrent via Biased Neighbor Selection", *26th IEEE International Conference on Distributed Computing Systems*, 2006. ICDCS 2006, (Jul. 2006), 10 pgs.

(Continued)

*Primary Examiner* — Philip B Tran
(74) *Attorney, Agent, or Firm* — Schwegman Lundberg & Woessner, P.A.

(57) ABSTRACT

A method and system for facilitating peer-to-peer networking among local peers are described. Hashes are generated from a digital content file and virtual coordinates of virtual nodes in a virtual coordinate system. The generated hashes are then used to retrieve peer connection information.

27 Claims, 13 Drawing Sheets

(56) References Cited

OTHER PUBLICATIONS

Choffnes, David, et al., "Taming the Torrent A practical approach to reducing cross-ISP traffic in peer-to-peer systems", ACM SIGCOMM Computer Communication Review vol. 38, Issue 4, (Oct. 2008), 14 pgs.

Cox, Russ, et al., "Practical, Distributed Network Coordinates", ACM SIGCOMM Computer Communication Review vol. 34, Issue 1, (Jan. 2004), 6 pgs.

Dabek, Frank, et al., "Vivaldi: A Decentralized Network Coordinate System", *SIGCOMM* 2004, Portland, OR, (Aug. 30-Sep. 3, 2004), 12 pgs.

Doi, Kenji, et al., "Proximity-Aware Content Addressable Network Based on Vivaldi Network Coordinate System", *Fifth International Workshop on Databases, Information Systems and Peer-to-Peer Computing (DBISP2P* 2007), Vienna (Austria), (Sep. 24, 2007), 10 pgs.

Su, Ao-Jan, et al., "Drafting Behind Akamai (Travelocity-Based Detouring)", *SIGCOMM* 2006, Pisa, Italy, (Sep. 11-15, 2006), 12 pgs.

"International Application Serial No. PCT/US2009/047742, Search Report mailed Jul. 28, 2009".

"International Application Serial No. PCT/US2009/047742, Written Opinion mailed Jul. 28, 2009".

"PCT Application Serial No. PCT/US2009/047742, International Preliminary Report on Patentability Received May 2, 2011", 12 pgs.

\* cited by examiner

——————————— CLIENT MACHINE'S CAPTURE ZONE

----------------------------- PEER B'S CAPTURE ZONE

US 9,106,668 B2

DISTRIBUTED PEER LOCATION IN PEER-TO-PEER FILE TRANSFERS

This application claims the priority benefit of U.S. Provisional Application No. 61/075,295, filed Jun. 24, 2008 and U.S. Provisional Application No. 61/133,314, filed Jun. 27, 2008, which are incorporated herein by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2008, Vuze, Inc. All Rights Reserved.

TECHNICAL FIELD

Example embodiments relate generally to peer-to-peer (P2P) file transfers over a network (e.g., the Internet).

BACKGROUND

BitTorrent is currently one of the most popular methods of distributing large files over the Internet. For a given file, the BitTorrent protocol embodies four main roles: an initial seeder, new seeders, a tracker, and peers. Initial seeders, new seeders, and peers are all transient clients; trackers are typically web servers. The initial seeder is the source of the file, and operates by dividing a file into small pieces, creating a metadata description of the file and sending this description to the tracker. Peers discover this file metadata description, usually as a .torrent file, through some out-of-band mechanism (e.g., a web page) and then begin looking for pieces of the file. Peers contact a central tracker to bootstrap their knowledge of other peers and seeds, and the tracker returns a randomized subset of other peers and seeds. Initially, only the initial seeder has pieces of a file, but soon peers are able to exchange missing pieces with each other. Once a peer acquires all of the pieces of a file, it becomes a new seeder. This collection of clients actively sharing a file is called a swarm.

In some client-based peer-to-peer (P2P) systems (e.g., the VUZE® client developed by Vuze, Inc. of Palo Alto, Calif.), file descriptors and other metadata are stored in a distributed hash table (DHT), in which all clients participate, and any node can be assigned the role of tracker if its unique identification number is equal or close to the hash of a given file's descriptor. This is mainly used as a backup mechanism when the original tracker is offline or otherwise not responding to requests for the file. However, the DHT is also a way to distribute a file without a central tracker at all or to locate additional peers that are not connected to a tracker.

Vivaldi is a virtual positioning algorithm that computes a position for every peer in the system such that the distance between two peers equals their round trip network ping time (RTT).

DETAILED DESCRIPTION

A method and system, according to an example embodiment, use a network coordinate system to locate low latency peers in order to increase the portion of peer-to-peer file sharing occurring among local peers. The located peers may be using the same Internet Service Provider (ISP), within the same autonomous system (AS), or connected through peering agreements. An example embodiment uses a virtual coordinate mapping algorithm and a distributed hash table to allow peers to discover other local peers participating in a peer-to-peer networking environment using the BitTorrent protocol. In the following description, for purposes of explanation, numerous specific details are set forth in order to provide a thorough understanding of the present invention. It will be evident, however, to one skilled in the art that the present invention may be practiced without these specific details.

Figure 1:
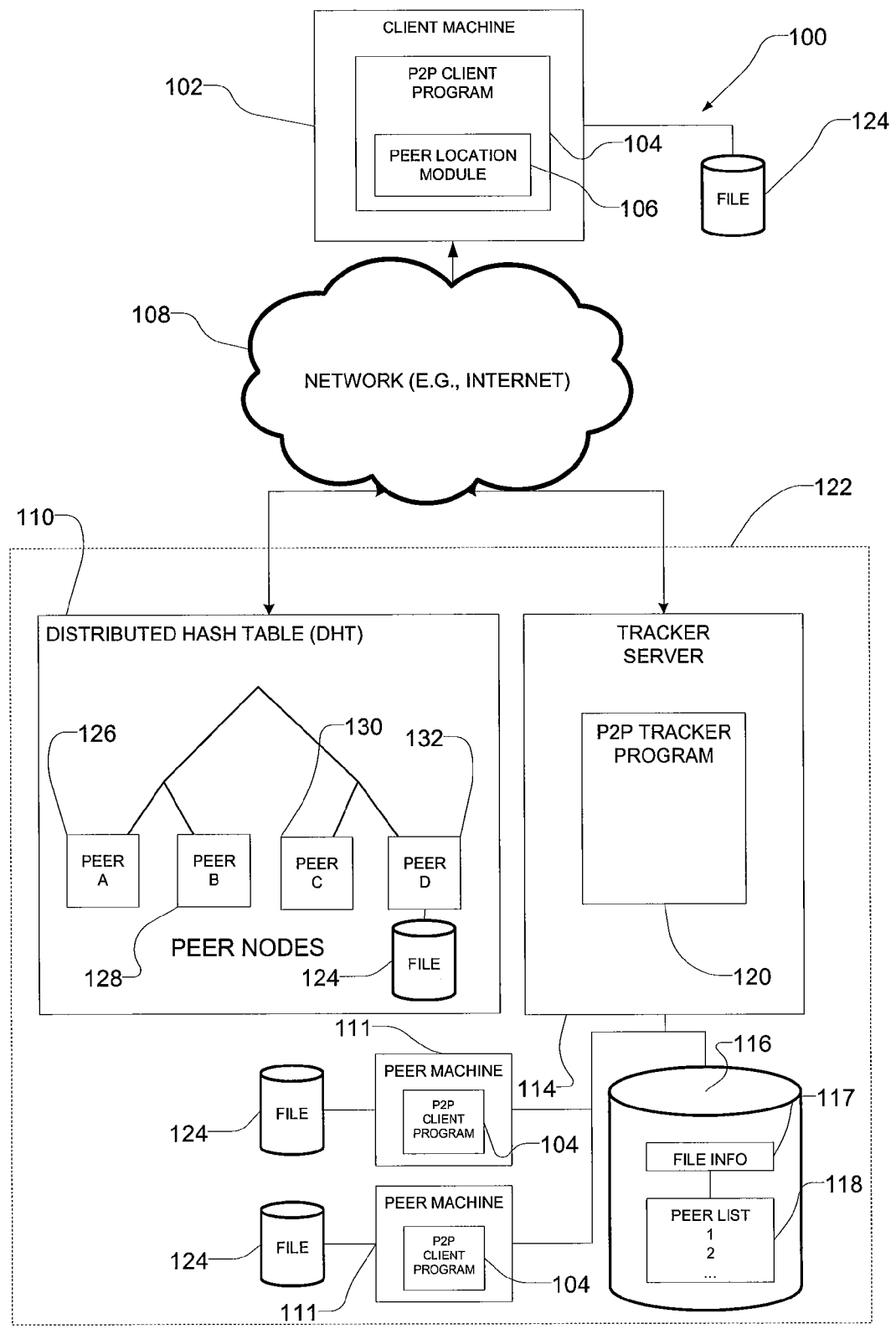
FIG. 1 is a network diagram illustrating a peer participating in a BitTorrent transfer over the Internet, according to an example embodiment.

FIG. 1 is a block diagram illustrating a peer-to-peer (P2P) networking environment 100 within which a P2P client program 104 running on a client machine 102 is connected to a swarm 122 comprising a group of peers 111, 126, 128, 130, 132 in order to distribute a file 124 over a network 108. The P2P client 104 may be connected to the swarm 122 after receiving Internet Protocol (IP) addresses and ports identifying peers from a tracker server 114 and a distributed hash table network 110 (DHT). The P2P client 104 will also send its IP address and port information to the tracker server 114, which will add the P2P client 104 to the peer list 118 for that file 124. Existing and newer peers may then connect to the client machine 102 to send and receive pieces of the file 124 being distributed.

Figure 2:
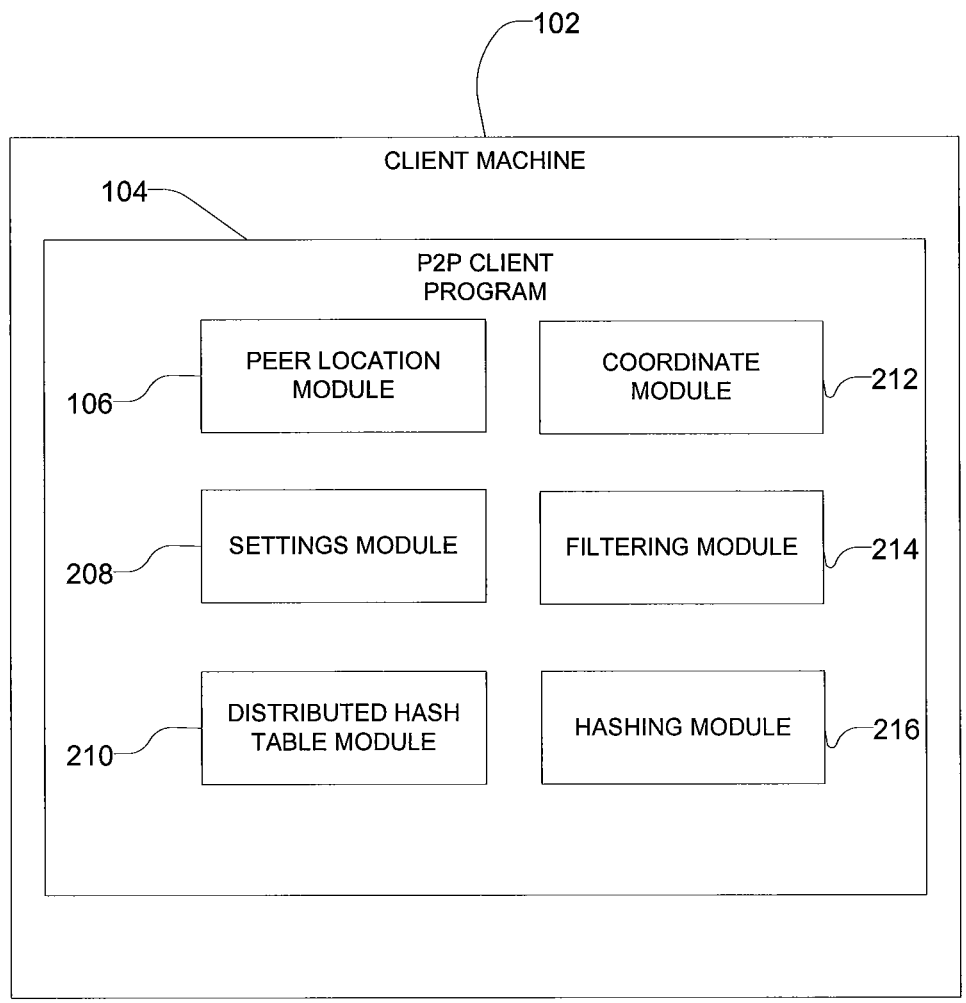
FIG. 2 is a block diagram of modules, according to an example embodiment, contained in a peer-to-peer (P2P) client program running on a client machine.

FIG. 2 is a block diagram of modules, according to an example embodiment, contained in a P2P client program 104 running on a client machine 102. The P2P client program 104 contains modules to perform the operations of an example embodiment, including a peer location module 106 to retrieve peer connection information for located peers, a settings module 208 to store preferences such as file priorities, a distributed hash table module 210 for connecting to and communicating with the DHT 110, a hashing module 216 for creating hashes, a coordinate module 212 for calculating network latencies and positions in a virtual coordinate system, and filtering module 214 to prioritize discovered peers.

Figure 3:
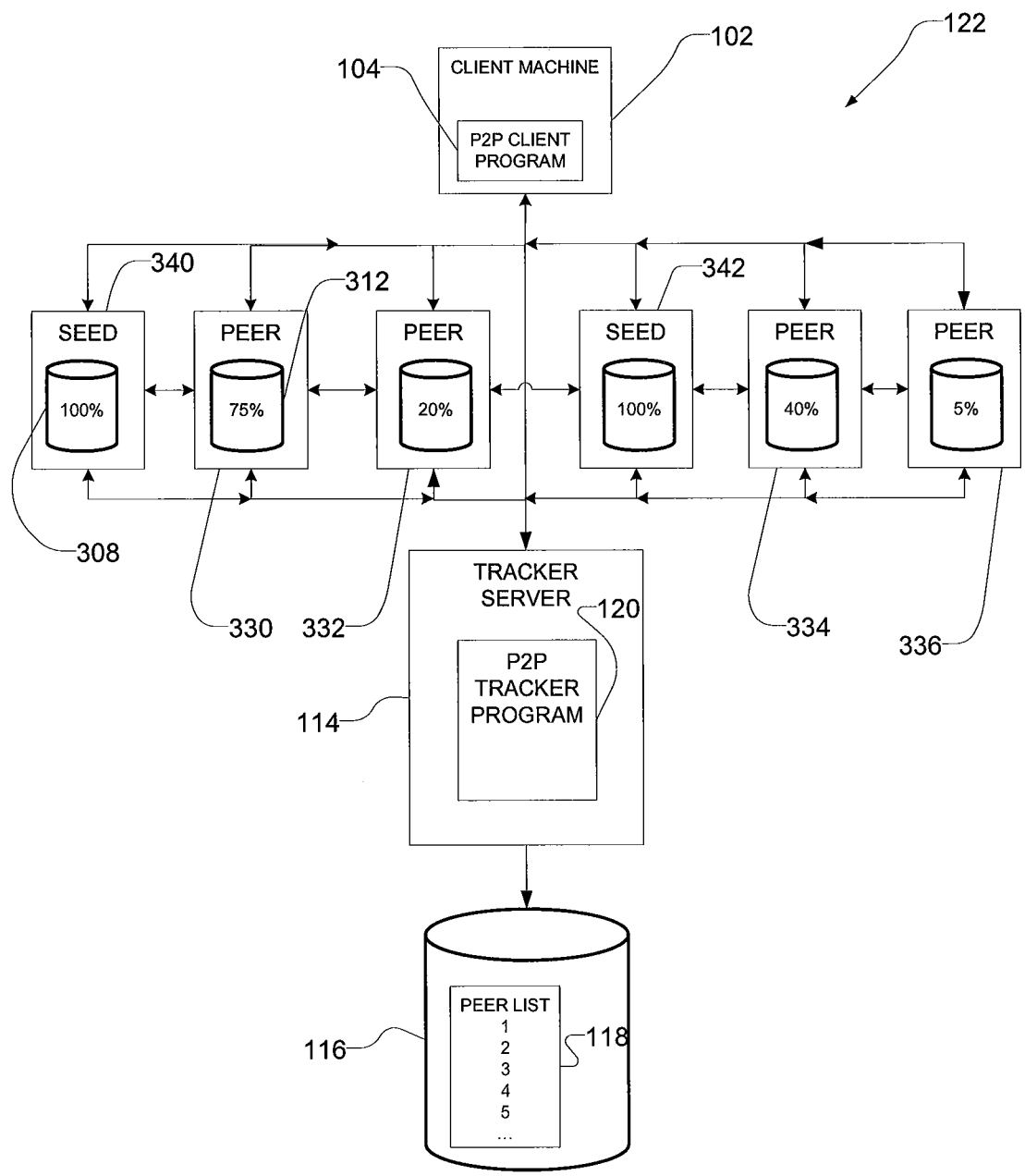
FIG. 3 is a network diagram illustrating a BitTorrent swarm containing peers and seeds connected to each other and a tracker, according to an example embodiment.

FIG. 3 is a block diagram illustrating a BitTorrent swarm 122 within which example embodiments may be deployed and within which peers 330, 332, 334, 336 and seeds 340, 342 are connected to one another and to a tracker server 114 over a network 108. For each torrent file, there may be listed more than one tracker server 114 running different P2P tracker programs 120 that contain unique peer lists 118 of each swarm member in a database 116. Multiple tracker servers 114 provide redundancy in case one of the servers becomes unreachable over the Internet. It is also possible for a torrent file to specify no trackers and instead rely on distribution methods that use the distributed hash table network 110, for example.

Seeds 340, 342 are a subset of peers that have received all pieces of the file 124 and are thus only uploading data to peers 330, 332, 334, 336 in the swarm 122. Non-seeding peers may have only partially completed the file 124 and are therefore both uploading and downloading data from the swarm. When a peer finishes downloading, it becomes a new seed and no longer needs to be connected to other seeds. All peers, including the seeds, may periodically contact the tracker server 114 to update their knowledge of the peer list 118.

Figure 4:
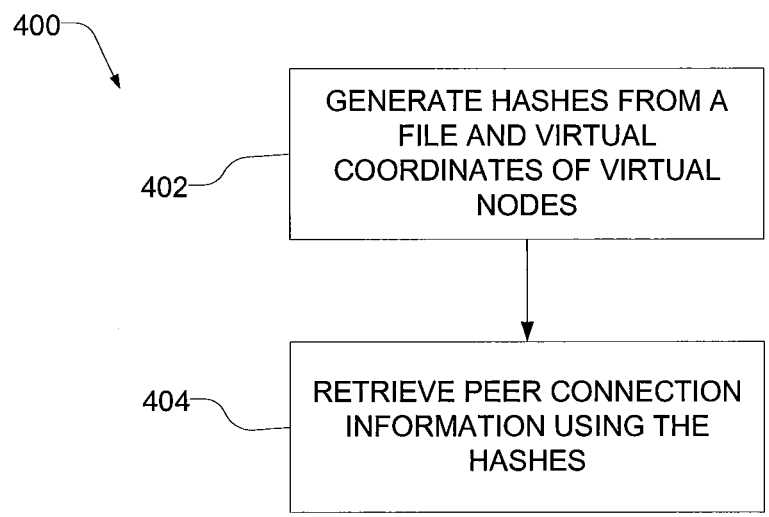
FIG. 4 is a flowchart of a method, according to an example embodiment, of facilitating peer-to-peer networking through local peers.

FIG. 4 illustrates a flowchart of the operations of a method 400, used in an example embodiment, to facilitate peer-to-peer networking through local peers. A client program 104 generates hashes from a file 124 and virtual coordinates of virtual nodes (operation 402) then retrieves peer connection information using the hashes (operation 404).

Figure 5:
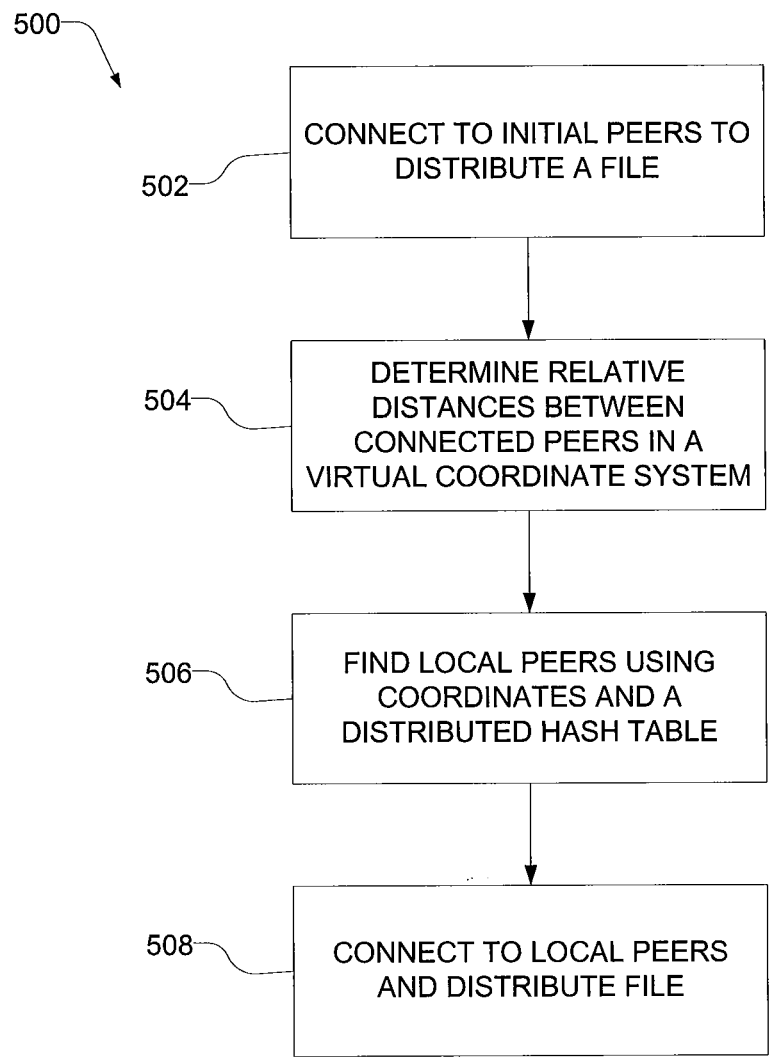
FIG. 5 is a flowchart overview of a method, according to an example embodiment, of using peer location to find local peers.

FIG. 5 illustrates a flowchart of the operations of a method 500, used in an example embodiment, to discover local peers using peer location. A client program 104 initially connects to other peers using the distributed hash table (DHT) module 210 to distribute a file 124 (operation 502). Next, the client program 104, using coordinate module 212, determines the relative distances between the client machine 102 and peers with which the client program 104 communicates through the DHT 110. The coordinate module 212 uses these distances to calculate a position for the client machine 102 in a virtual coordinate system 1100 (see FIG. 11). Using the hashing module 216, the client program 104 creates hashes from the file 124 and nearby virtual nodes 1110 in the virtual coordinate system 1100. The client program 104 then requests lists of peers from the DHT 110 using the hashes as keys (operation 506). Finally, the client program 104 connects to the peers on the lists and continues to distribute the file 124 (operation 508).

Figure 6:
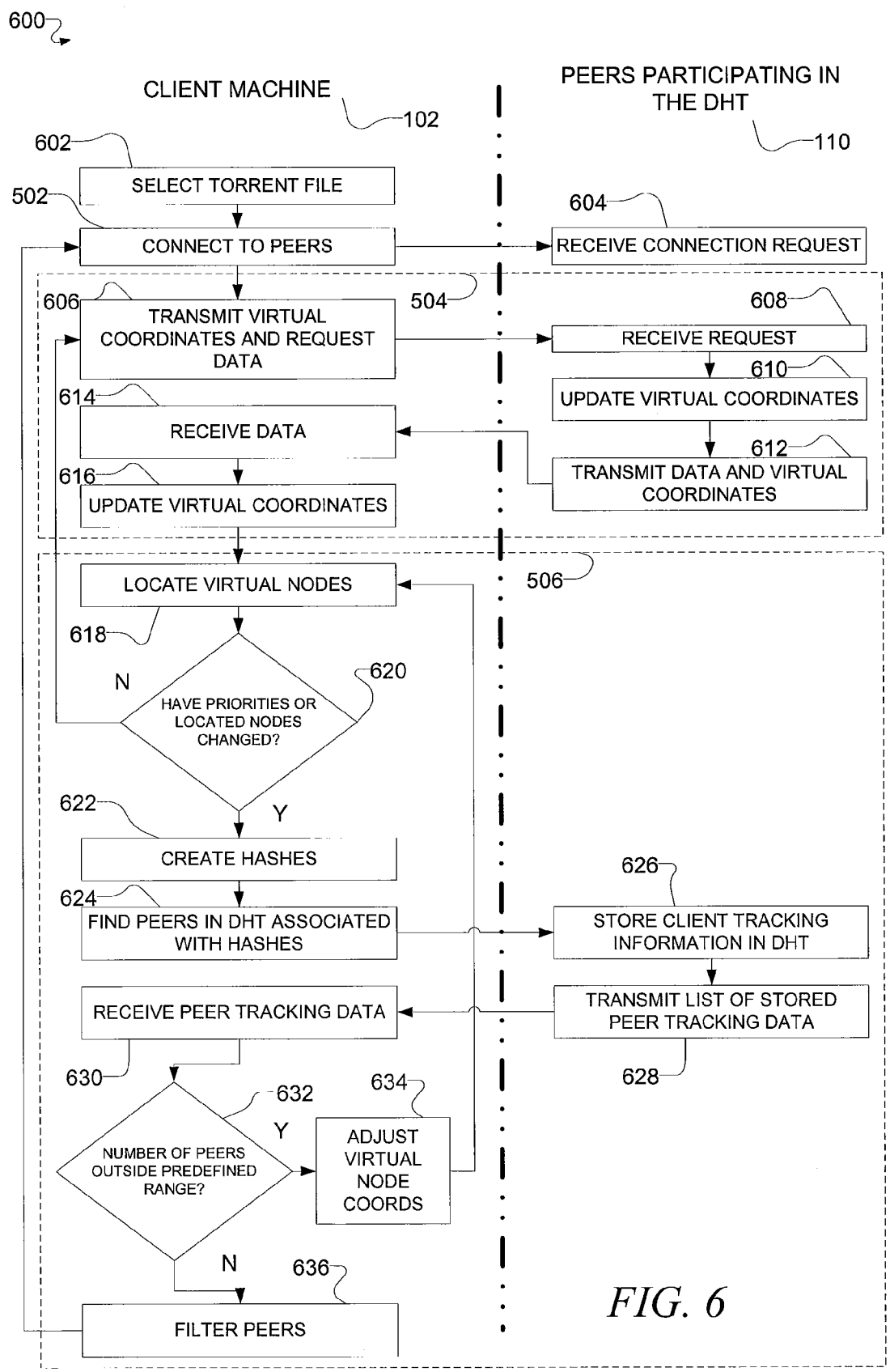
FIG. 6 is a dual-lane flowchart of operations, according to an example embodiment, that are performed to find local peers.

FIG. 6 is a dual-lane flowchart depicting in greater detail the operations of the method 500, illustrated in FIG. 5. Operations on the left side of FIG. 6 are executed on the client machine 102, while operations on the right side are executed on remote machines belonging to other peers participating in the P2P distributed hash table network 110. At operation 602, a user selects a torrent file and executes a client program 104. The user may have created the torrent file from one of his own files, or he may have downloaded it from the Internet.

Figure 7:
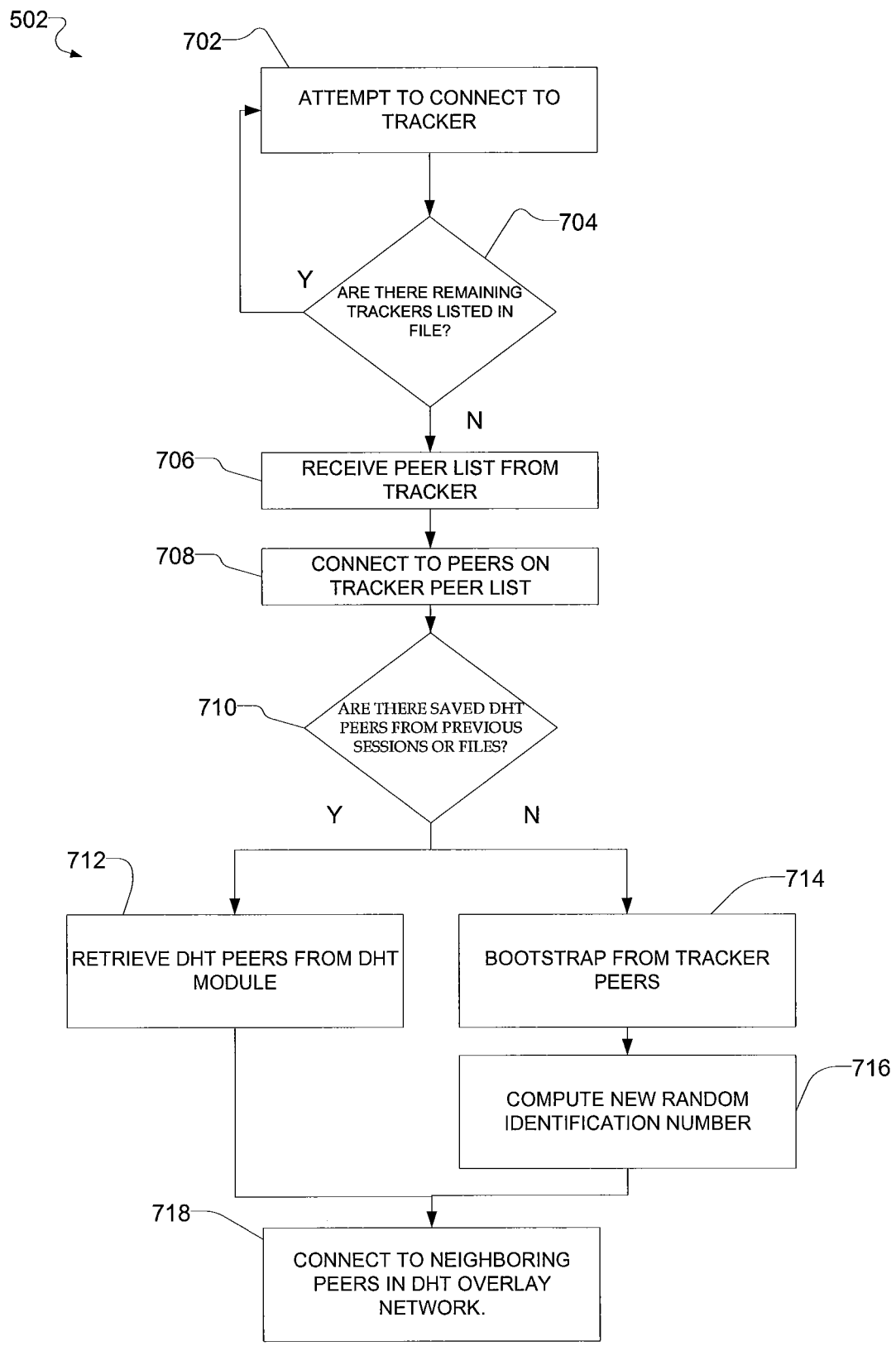
FIG. 7 is a flowchart of operations, according to an example embodiment, that are performed to connect to peers received from trackers and the distributed hash table (DHT).

At operation 502, the client program 104 connects to other peers over the network, as illustrated in FIG. 7. If the selected torrent file lists any tracker Uniform Resource Locators (URLs) the client program 104 attempts to connect to each tracker server 114 at operation 702. The client program 104 receives a peer list 118 from each tracker server 114, and the tracker server 114 adds the IP address and port number of the client machine 102 to the list. The peer list 118 sent by the tracker server 114 may contain every peer on the tracker's list if there are only a few peers connected; otherwise, it may contain a random set of peers. Each peer on this list is currently participating in the distribution of the file 124 or was recently participating and has not yet been removed from the peer list 118 by the tracker server 114. At operation 708, the client program 104 connects to some of the received peers on the list, the number depending on preferences stored in the settings module 208.

At operation 710, the client program 104 checks the distributed hash table module 210 to determine if there are any saved DHT peers from previous sessions or files. If so, the client program 104 retrieves the DHT peers from the DHT module 210. If not, the client program 104 must bootstrap its knowledge of the DHT from the tracker peers (operation 714), and then compute a new random, unique identification number (operation 716). At operation 718, the client program 104 connects to neighboring peers in the DHT overlay network.

Referring back to FIG. 6, peers participating in the DHT receive the client program 104 connection request and store the client's peer connection information (IP address and port number) and identification number (operation 604) in the DHT.

After connecting to peers, the client program 104 begins or resumes sending and receiving pieces of the file 124 being distributed. At operation 606, the client program 104 requests data from other peers and transmits its current virtual coordinates if they have been previously calculated. The remote peer receives this request (operation 608) and determines the latency between itself and the client machine 102. In remote procedure call-based systems (RPC), the latency can be determined by timing the RPC; in a stream oriented system, the remote peer may echo a timestamp. The remote peer updates its own virtual coordinates using the latency and the coordinates of the client machine 102 (operation 610) using a virtual positioning algorithm (e.g., the Vivaldi algorithm). The remote peer then transmits the requested data back to the client program 104 along with the updated virtual coordinates of the remote peer (operation 612). At operation 614, the client program 104 receives the data sent by the remote peer. At operation 616, the client program 104 updates its virtual coordinates based on the latency and coordinates of the remote peer. The process of updating virtual coordinates is illustrated in FIG. 8.

Figure 8:
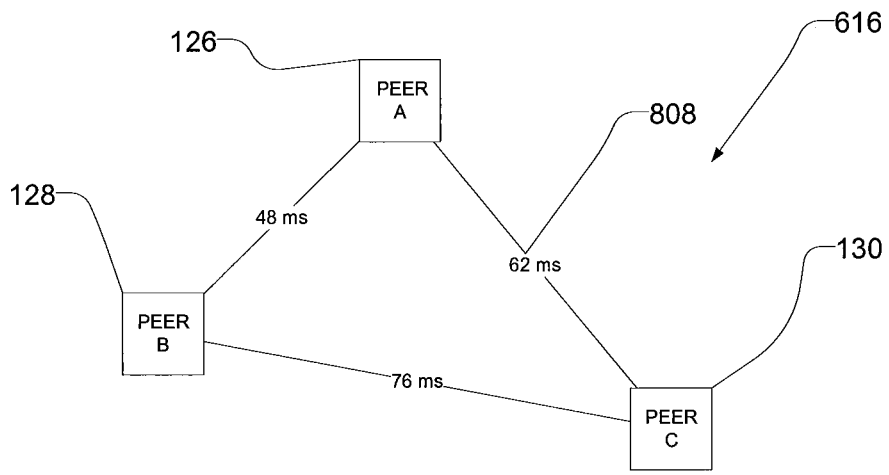
FIG. 8 is a block diagram showing three peers participating in a DHT arranged by round trip time (RTT) latency approximations, according to example an embodiment.

FIG. 8 is a virtual network position graph that shows three peer nodes 126, 128, 130 that have computed their virtual coordinates using a virtual positioning algorithm such that the distances between nodes in the virtual coordinate system are similar to their round trip ping times 808 (RTT). Whenever the peers communicate (e.g., through data transfers or DHT ping, find, get, and store requests), they update their virtual coordinates based on the RTT of the packets sent.

Figure 9:
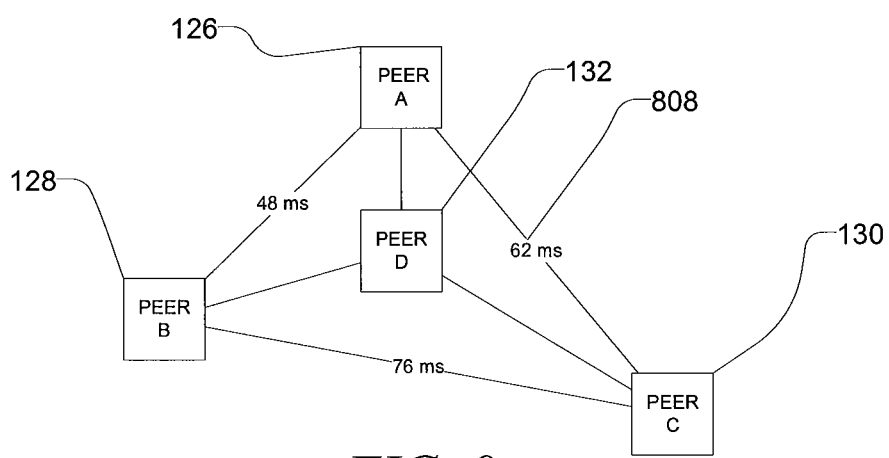
FIG. 9 is a block diagram of a new peer being added to the DHT, according to an example embodiment.
Figure 10:
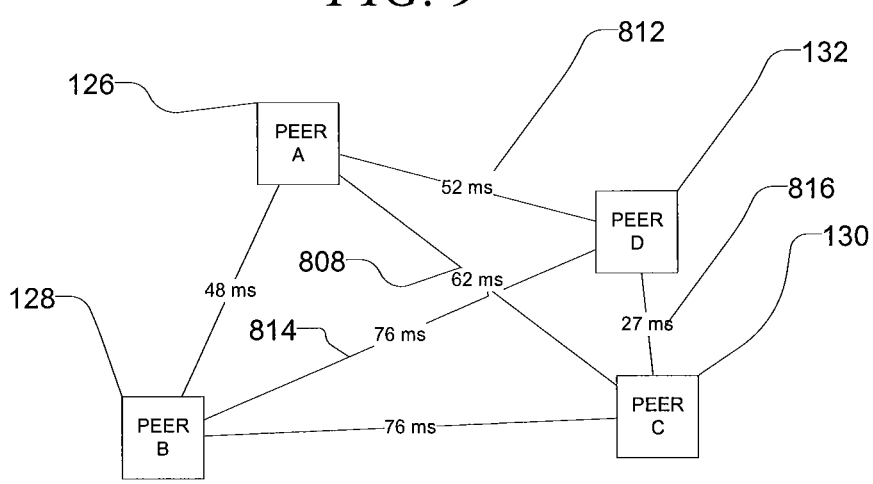
FIG. 10 is a block diagram of the updated positions for the four peers in the DHT after pinging and adjusting locations based on RTT latency approximations, according to an example embodiment.

FIG. 9 is a virtual network position graph illustrating a new peer 132 connecting to the DHT network 110 with no location information. In this example, the new peer 132 first determines its starting coordinates by contacting peers A, B, and C. After exchanging location information, in FIG. 10, the four peers have calculated new coordinates that accurately reflect their ping times 808, 812, 814, and 816.

Figure 11:
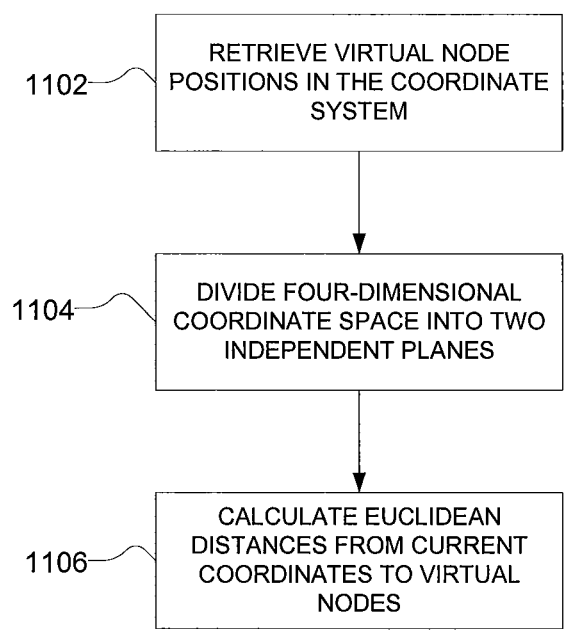
FIG. 11 is a flowchart of operations, according to an example embodiment, performed to locate the nearest virtual nodes to a client in a virtual coordinate system.

At operation 618, the client program 104 locates the nearest virtual nodes 1210. FIG. 11 is a flowchart of an example embodiment that uses the Vivaldi virtual positioning algorithm with four dimensions. At operation 1102, the client program 104 retrieves the virtual node positions in the coordinate system from the coordinate module 212. The virtual nodes 1210 are arranged in a fixed pattern that is known to the coordinate module 212, an example of which can be seen in FIG. 12. The example four-dimensional coordinate space is divided into two independent planes at operation 1104, one of which is shown as a two-dimensional Cartesian coordinate plane 1216 in FIG. 12. At operation 1106, the client program 104 calculates the Euclidean distances 1208 between it and the virtual nodes 1210.

Figure 12:
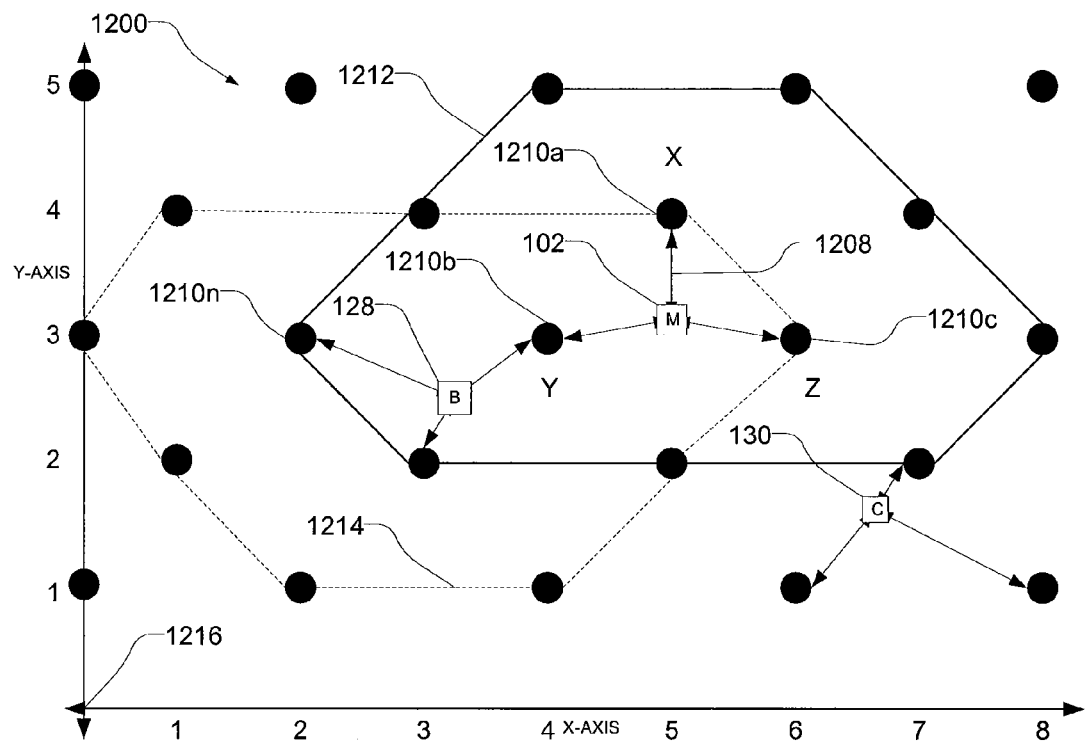
FIG. 12 is a Cartesian coordinate plane representing a virtual coordinate system depicting three peers and the capture zones for two of them, according to an example embodiment.

In the FIG. 12 example, client machine 102 is closest to virtual nodes X, Y, and Z (1210a, 1210b, 1210c). In an example embodiment utilizing the nearest three virtual nodes 1210 in each plane, the solid hexagon represents the client machine's capture zone 1212. Any peer located within the hexagon's boundaries shares a close virtual node 1210 with the client machine 102. In this example, one of three closest virtual nodes 1210 to peer B 128 is virtual node Y 1210b, which is shared with the client machine 102; therefore, peer B 128 is also within the client machine's capture zone 1212, and the client machine 102 is within peer B's capture zone 1214. Peer C 130, on the other hand, shares no close virtual nodes 1210 with the client machine 102 or peer B, and is therefore outside of their capture zones. Peers outside of the capture zone 1212 are not local peers; peers within the capture zone 1212 may be local peers, but the final determination will depend on priorities, filtering, and whether the peer is also within the capture zone of the other independent plane.

If both the closest nodes to the client machine 102 and priorities from the settings module 208 remain unchanged, the client program 104 continues to distribute the file 124 among already connected peers. If either the closest nodes or priorities have changed since the last update, the client program 104 will create new hashes (operation 622) and attempt to locate new local peers.

Figure 13:
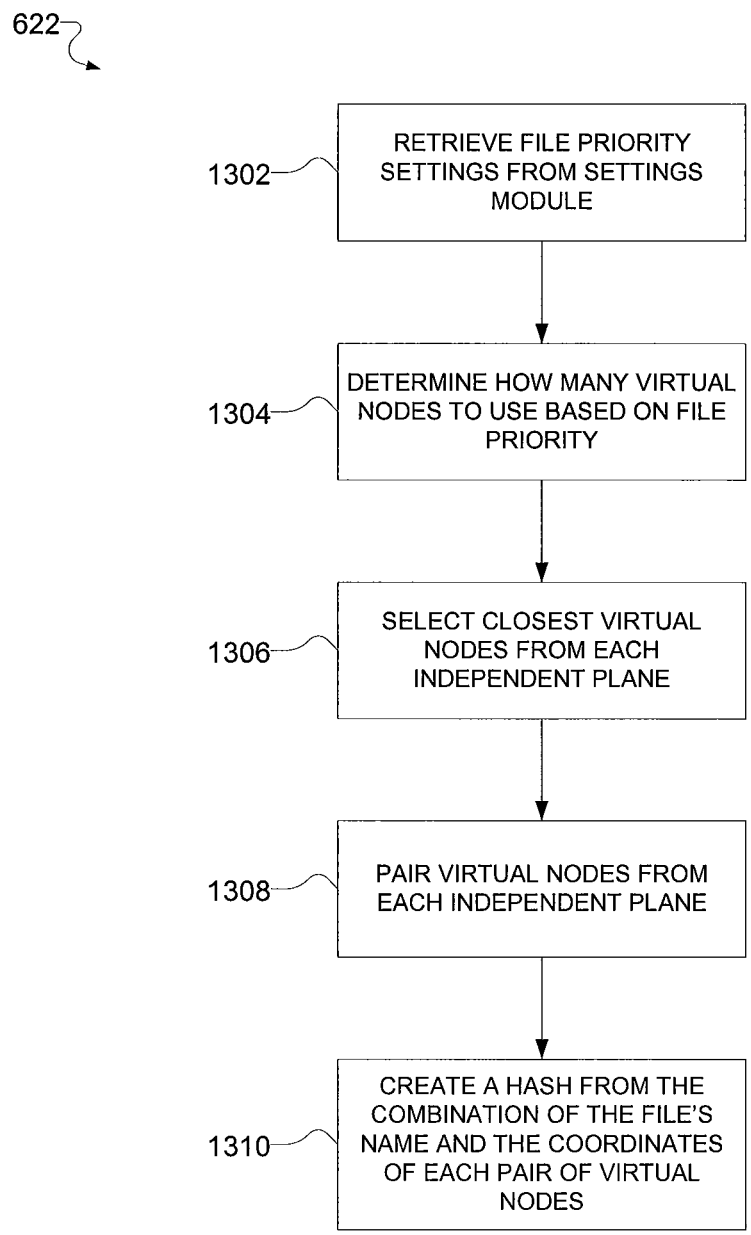
FIG. 13 is a flowchart of operations, according to an example embodiment, performed to prioritize files and create hashes for use in the DHT.

FIG. 13 is a flowchart illustrating the hashing process using FIG. 12 as an example. First, file priority settings are retrieved from the settings module 208 at operation 1302, and the number of virtual nodes 1210 to be used in the hashing process is calculated at operation 1304. In one example embodiment, a client program 104 distributing a small number of files will select three virtual nodes 1210 from each plane 1216, whereas a client program 104 distributing a larger number of files simultaneously may reduce DHT traffic by only selecting one or two virtual nodes 1210 (operation 1306). These virtual nodes 1210 may be prioritized by proximity to the client in the virtual positioning system with closer nodes receiving higher priority. A client may choose to publish its own connection information using a different number of virtual nodes 1210 than from which it receives peer connection information. A client may also publish or receive peer connection information for one subset of virtual nodes 1210 and then later publish or receive peer connection information using a different subset.

In one example embodiment, four dimensions calculated using the Vivaldi algorithm are divided into two independent planes with a triangular mesh pattern, as can be seen in FIG. 12. A client program 104 running on client machine 102 will calculate the nearest three virtual nodes X, Y, and Z (1210a, 1210b, 1210c) in one plane 1216 and virtual nodes 1, 2, and 3 in the other plane (not shown). In this diagram, virtual node X 1210a is located at virtual coordinates (5, 4) in the plane 1216. Virtual node Y 1210b is located at (4, 3), and virtual node Z 1210c is located at (6, 3). These six nodes (X, Y, Z, 1, 2, and 3) are paired into nine combinations as X1, X2, X3, Y1, Y2, Y3, Z1, Z2, and Z3 (operation 1308). A hash, an integer representation of data, is calculated for each node pairing using the file 124 (or filename) and the virtual coordinates of the node pair as input to a hashing algorithm (operation 1310). The trade-off of having more dimensions and nodes is more accurate peer location but also more network traffic within the DHT.

Figure 14:
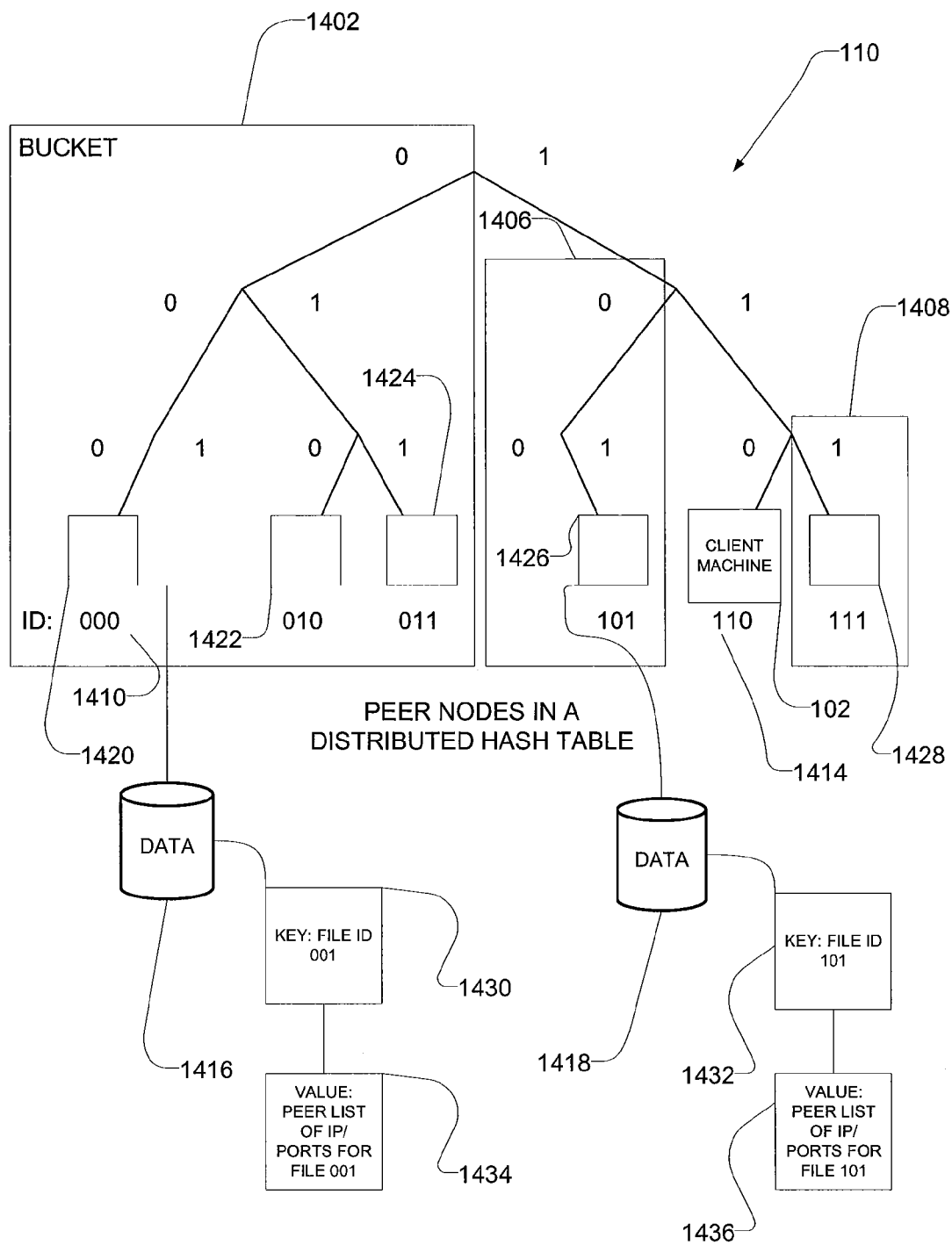
FIG. 14 is a block diagram of a DHT tree showing node IDs and distance buckets, according to an example embodiment.

FIG. 14 is a network partition of a DHT 110 containing peer nodes 1420, 1422, 1424, 1426, 1428, and the client machine 102. In this simplified example, the nodes are indexed in the DHT with a three-bit ID 1410, 1414 (typical implementations use 160 bits).

In a file sharing DHT network, the task of indexing the table of available files is distributed among all clients. A hash is computed for each file and is of the same size as the node IDs. If a user wishes to share a file 1430, 1432 among users of the DHT 110, the client uses the file's hash as a key 1430, 1432 to find the ID of a node that is most similar to the file hash, and the client stores its connection information in that node's database 1416, 1418 as values. The similarity is determined by a distance algorithm that computes the exclusive-or (XOR) of the file hash and the node ID; smaller values are closer matches. In FIG. 14, the peer list 1436 for file 1432 with the hash of '101' is stored in the node 1426 with the ID '101' because the file hash and node ID match; the peer list 1434 for file 1430 with the hash of '001' is stored in the node 1420 with the ID '000' because node ID '001' does not exist and '000' is the closest match. In typical implementations, DHT keys and values are stored in the closest twenty nodes to the hash to provide for redundancy in a network that regularly loses and gains nodes and also to defend against malicious nodes that attempt to disrupt the network. Peers also retrieve data from the closest twenty nodes.

In an example embodiment of using local peer discovery, the hashes created at operation 622 are used as keys in the DHT 110. For each key, the client program peer location module 106 finds the peer node associated with the key (operation 624) and requests the list of peers associated with the hash. The peers on these lists are distributing the same file 124 as the client program 104, and they are local peers because they are located near the client machine 102 in the virtual coordinate system.

At operation 626, the DHT peer node stores the client's connection information so that other peers may later discover the client machine 102 through local peer discovery. At operation 628, the DHT peer node transmits peer connection information for the list of stored peers, which is received by the client machine 102 at operation 630.

If the number of peers received from the DHT is outside of a predefined range (either too many or too few), the client program 104 adjusts the coordinates of the virtual nodes 1110 in order to decrease or increase its capture zone 1212 (operation 634). This allows the system to dynamically compensate for geographic regions that may be densely or sparsely populated. If this is necessary, the client program 104 repeats operation 506.

After receiving a number of peers within the predefined range from the DHT 110, the peers may be filtered and prioritized (operation 636) using information such as IP addresses and domain name system (DNS) lookups to determine the ISP and AS of the peers. This operation prioritizes peers that are determined to be connected to the network using the same ISP as the client machine 102 and removes any erroneously discovered peers. Accordingly, the latency between prioritized peers is short and those peers are likely to be using the same ISP or located within the same AS, thus reducing cross-ISP traffic. The client program 104 then connects to the remaining peers to continue distributing the file 124.

Peer-to-peer file sharing programs such as BitTorrent typically ignore network latency in favor of throughput because receiving the entire file as fast as possible is more important than receiving any individual piece quickly. However, this preference also ignores traffic costs at ISPs and generates a large amount of cross-ISP traffic. As a result, ISPs often throttle BitTorrent traffic as a way to control costs from high bandwidth users. By implementing a method of discovering local peers in file transfers, ISPs will save money on bandwidth charges and users may experience faster download rates because a greater amount of traffic will remain within the ISP or autonomous system.

The difficulty involved with finding local peers is that IP addresses and DNS information often maps to physical location incorrectly, which makes them unreliable sources. Also, a single autonomous system number may span a large geographic area. Furthermore, since trackers return random peers from the swarm, a client may not know that local peers are connected to the swarm at all, and pinging every client connected to a DHT is an expensive network operation.

Some solutions to this problem involve the cooperation of the trackers to improve their peer selection algorithms, but since there are many tracker websites and tracker software applications on the Internet, convincing them to change is difficult. The method described above is a client-side solution that does not require the participation of trackers to be effective.

Modules, Components and Logic

Certain embodiments are described herein as including logic or a number of components, modules, or mechanisms. A component is a non-transitory and tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component may be implemented mechanically or electronically. For example, a component may comprise dedicated circuitry or logic that is permanently configured (e.g., as a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiple of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, one component may perform an operation, and store the output of that operation in a memory device to which it is communicatively coupled. A further component may then, at a later time, access the memory device to retrieve and process the stored output. Components may also initiate communications with input or output devices, and can operate on a resource (e.g., a collection of information).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various example embodiments.

Example Machine Architecture and Machine-Readable Medium

Figure 15:
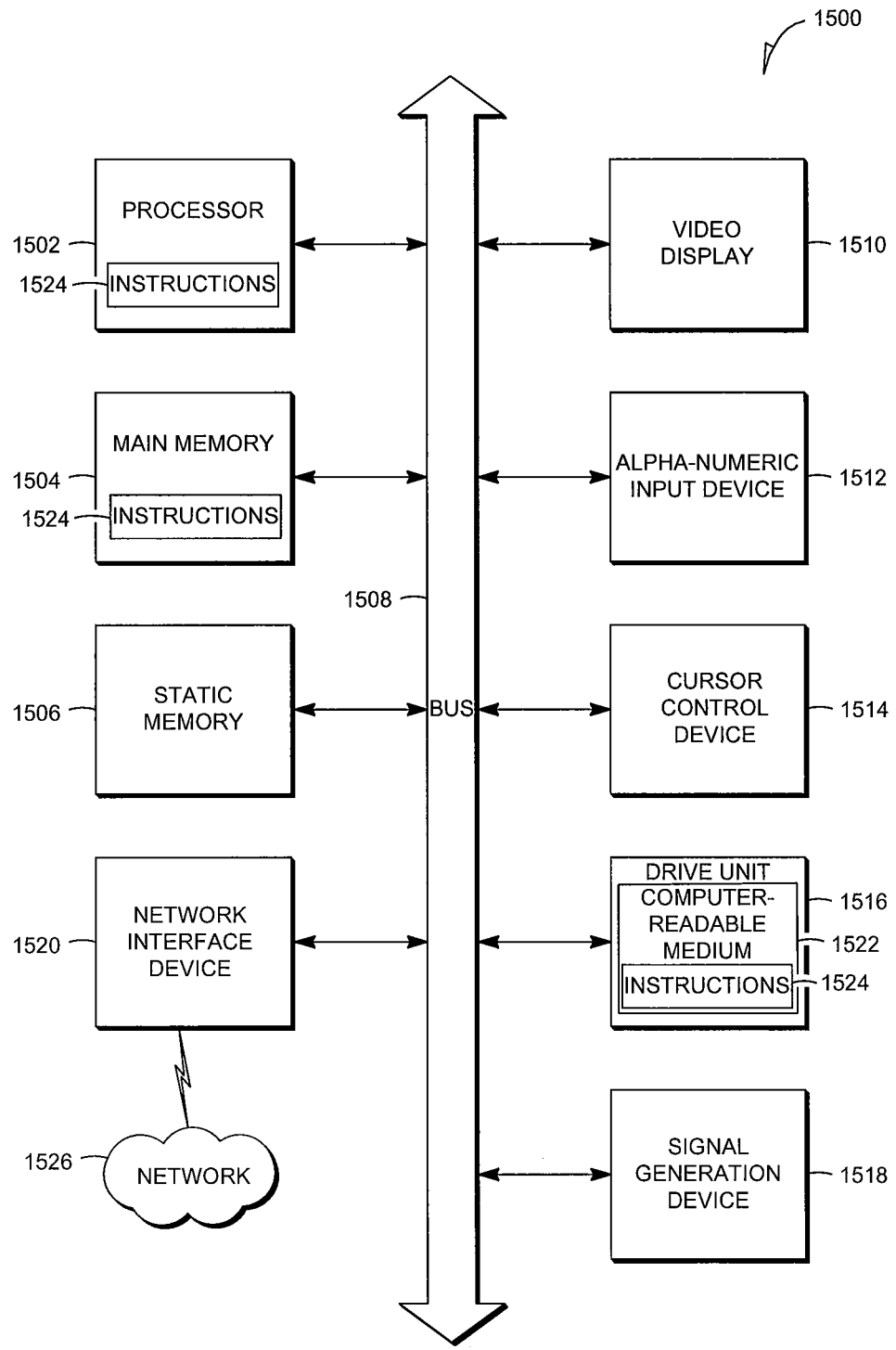
FIG. 15 shows a diagrammatic representation of a machine in the exemplary form of a computer system.

FIG. 15 is a block diagram of machine in the example form of a computer system 1500 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine 102 in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes at least one processor 1502 (e.g., a central processing unit (CPU), a graphics processing unit (GPU) or both), a main memory 1504 and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard), a user interface (UI) navigation device 1514 (e.g., a mouse), a disk drive unit 1516, a signal generation device 1518 (e.g., a speaker) and a network interface device 1520.

Machine-Readable Medium

The disk drive unit 1516 includes a machine-readable medium 1522 on which is stored one or more sets of instructions and data structures (e.g., software 1524) embodying or utilized by any one or more of the methodologies or functions described herein. The software 1524 may also reside, completely or at least partially, within the main memory 1504 and/or within the processor 1502 during execution thereof by the computer system 1500, the main memory 1504 and the processor 1502 also constituting machine-readable media.

While the machine-readable medium 1522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 1524 may further be transmitted or received over a communications network 1526 using a transmission medium. The software 1524 may be transmitted using the network interface device 1520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible medium to facilitate communication of such software.

Example Three-Tier Software Architecture

In some embodiments, the described methods may be implemented using one a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third, storage tier, may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology, or, a variety of technologies. The example three-tier architecture, and the technologies through which it is implemented, may be realized on one or more computer systems operating, for example, as a standalone system, or organized in a server-client, peer-to-peer, distributed or so some other suitable configuration. Further, these three tiers may be distributed between more than one computer systems as various components.

Components

Example embodiments may include the above described tiers, and processes or operations about constituting these tiers may be implemented as components. Common to many of these components is the ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Enterprise JavaBeans (EJB), Component Object Model (COM), Distributed Component Object Model (DCOM), or other suitable technique.

Software for these components may further enable communicative coupling to other components (e.g., via various Application Programming interfaces (APIs)), and may be compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Example embodiments may use the OSI model or TCP/IP protocol stack model for defining the protocols used by a network to transmit data. In applying these models, a system of data transmission between a server and client, or between peer computer systems may for example include five layers comprising: an application layer, a transport layer, a network layer, a data link layer, and a physical layer. In the case of software, for instantiating or configuring components, having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A method to facilitate peer-to-peer networking, the method comprising:
automatically generating, by one or more processors, a plurality of hashes, each hash being generated from both a digital content file and virtual coordinates of one of a plurality of virtual nodes in a virtual coordinate system, wherein the plurality of virtual nodes are selected by calculating distances between a plurality of peers to determine a location in the virtual coordinate system, calculating respective distances between the location and the plurality of virtual nodes, and selecting the plurality of nodes based on the respective distances; and
retrieving peer connection information using the plurality of hashes.

2. The method of claim 1, wherein the peer-to-peer networking uses the BitTorrent protocol.

3. The method of claim 1, wherein the virtual coordinate system is a four-dimensional virtual coordinate system.

4. The method of claim 3, further comprising:
dividing the four-dimensional virtual coordinate system into two independent two-dimensional coordinate planes;
arranging the plurality of virtual nodes in a triangular mesh pattern; and
combining three virtual nodes of the plurality of virtual nodes in each plane which are closest to a peer to create nine combinations.

5. The method of claim 1, further comprising:
updating the coordinates of the plurality of virtual nodes when retrieving peer connection information using a hash retrieves a number of peers outside a predefined range.

6. The method of claim 1, wherein the peer connection information is retrieved from a distributed hash table network.

7. The method of claim 1, further comprising:
storing first peer connection information for a first client machine using the plurality of hashes.

8. The method of claim 7, wherein the first peer connection information is stored in a distributed hash table network.

9. The method of claim 1, further comprising:
prioritizing the hashing of a number of virtual nodes of the plurality of virtual nodes used for hashing based on a number of digital content files currently being distributed.

10. The method of claim 1, further comprising:
filtering the peer connection information based on at least one of Internet Protocol addresses or domain name system lookups.

11. The method of claim 1, further comprising:
connecting to peers using the peer connection information; and
distributing the digital content file using the peer-to-peer network.

12. The method of claim 1, wherein the peer connection information consists of an Internet Protocol address and a port number.

13. The method of claim 1, wherein the distances between a plurality of peers is equal to the latency between the peers.

14. A system to facilitate peer-to-peer networking, the system comprising:
one or more processors;
a hashing module, implemented by the one or more processors, to automatically generate a plurality of hashes, each hash being generated from both a digital content file and coordinates of one of a plurality of virtual nodes in a virtual coordinate system, wherein the plurality of virtual nodes are selected by calculating distances between a plurality of peers to determine a location in the virtual coordinate system, calculating respective distances between the location and the plurality of virtual nodes, and selecting the plurality of nodes based on the respective distances; and
a peer location module, implemented by the one or more processors, to retrieve peer connection information using the plurality of hashes.

15. The system of claim 14, wherein the peer-to-peer networking uses the BitTorrent protocol.

16. The system of claim 14, wherein the virtual coordinate system is a four-dimensional virtual coordinate system.

17. The system of claim 16, further comprising a coordinate module to:
divide the four-dimensional virtual coordinate system into two independent two-dimensional coordinate planes;
arrange the plurality of virtual nodes in a triangular mesh pattern; and
combine three virtual nodes in each plane which are closest to a peer to create nine combinations used in a hashing operation.

18. The system of claim 14, further comprising a coordinate module to:
update the coordinates of the plurality of virtual nodes when retrieving peer connection information using a hash retrieves a number of peers outside a predefined range.

19. The system of claim 14, wherein the connection information is retrieved from a distributed hash table network.

20. The system of claim 14, wherein the peer location module also stores first peer connection information for a first client machine using the plurality of hashes.

21. The system of claim 20, wherein the first peer connection information is stored in a distributed hash table network.

22. The system of claim 14, further comprising:
prioritizing the hashing of a number of virtual nodes of the plurality of virtual nodes used for hashing based on a number of digital content files currently being distributed.

23. The system of claim 14, further comprising:
filtering the peer connection information based on at least one of Internet Protocol addresses or domain name system lookups.

24. The system of claim 14, further comprising:
connecting to peers using the peer connection information; and
distributing the digital content file using the peer-to-peer network.

25. The system of claim 14, wherein the peer connection information consists of an Internet Protocol address and a port number.

26. The system of claim 14, wherein the distances between a plurality of peers is equal to the latency between the peers.

27. A method to facilitate peer-to-peer networking, the method comprising:
using one or more processors to execute instructions retained in machine-readable media to perform at least some portion of:
generating automatically a plurality of hashes, each hash being generated from both a digital content file and virtual coordinates of one of a plurality of virtual nodes in a virtual coordinate system, wherein the plurality of virtual nodes are selected by calculating distances between a plurality of peers to determine a location in the virtual coordinate system, calculating respective distances between the location and the plurality of virtual nodes, and selecting the plurality of nodes based on the respective distances; and
retrieving peer connection information using the plurality of hashes.

* * * * *